Dec. 22, 1925.　　　　　E. P. GALASSI　　　　　1,566,743
FENDER FOR ROAD VEHICLES
Filed June 21, 1924　　　　2 Sheets-Sheet 1
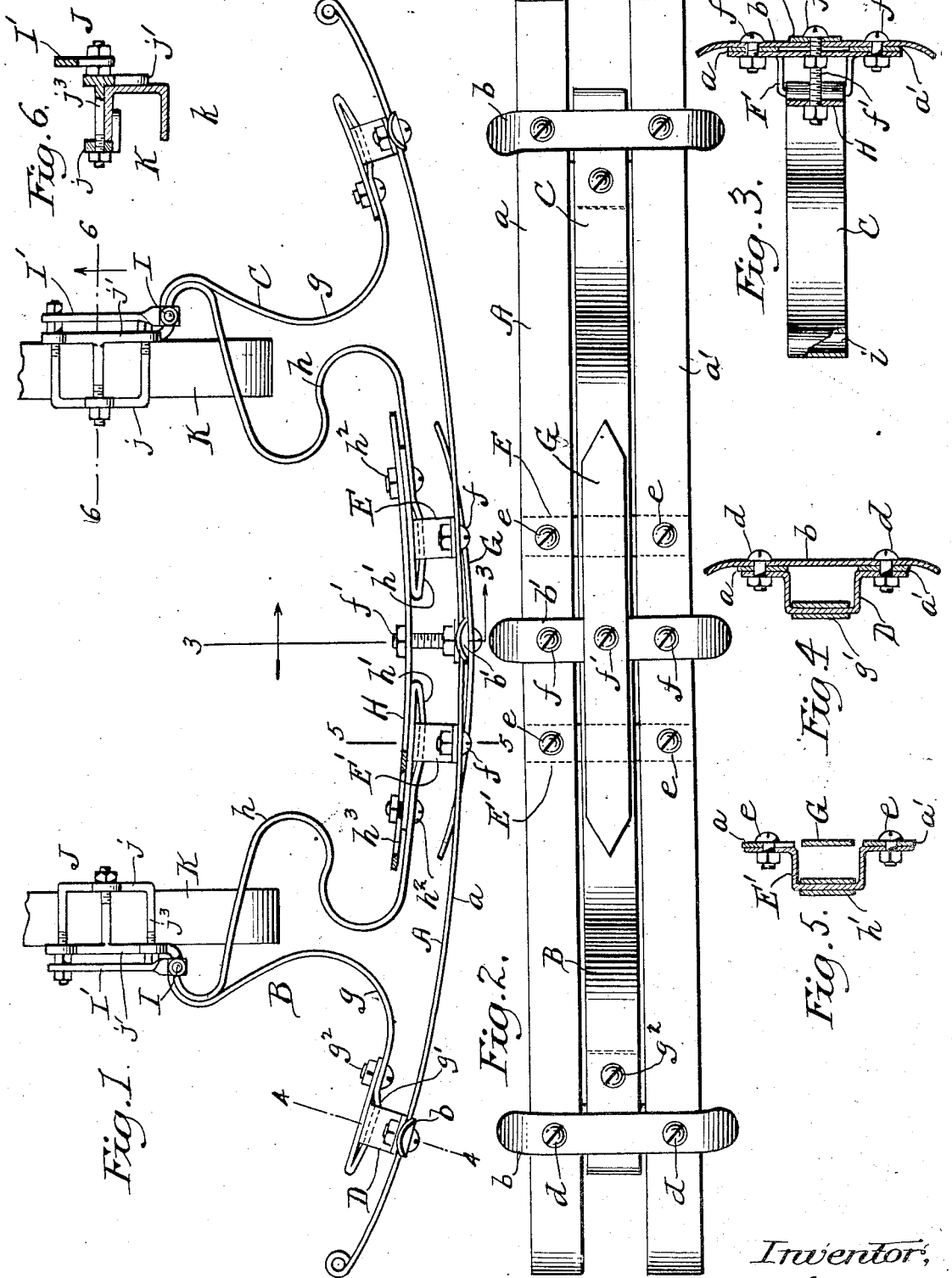

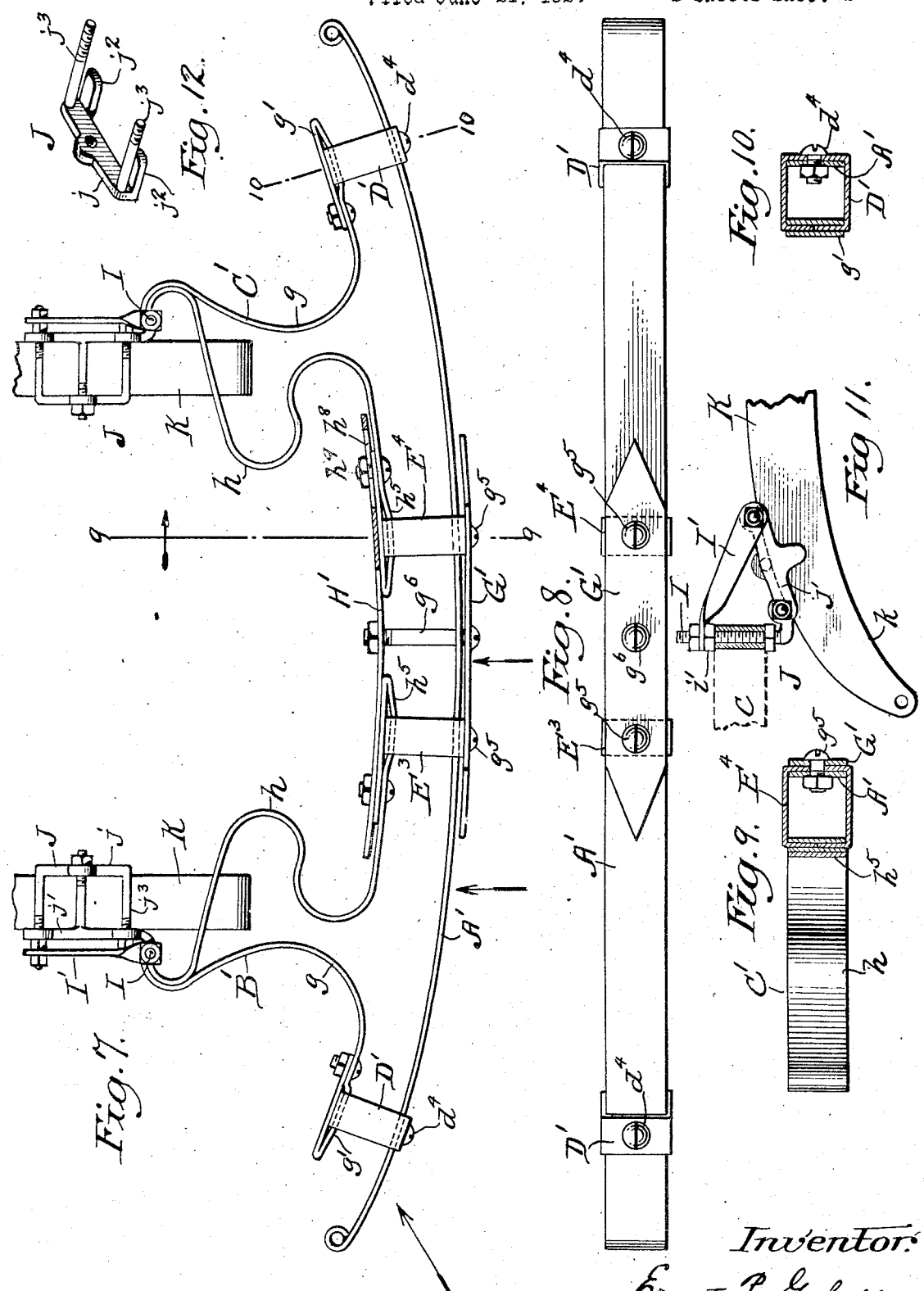

Patented Dec. 22, 1925.

1,566,743

UNITED STATES PATENT OFFICE.

ERNEST P. GALASSI, OF BROOKLYN, NEW YORK.

FENDER FOR ROAD VEHICLES.

Application filed June 21, 1924. Serial No. 721,453.

*To all whom it may concern:*

Be it known that I, ERNEST P. GALASSI, a subject of the King of Italy, residing at the city of New York, borough of Brooklyn, county of Kings, and State of New York, have invented a certain new and useful Improvement in Fenders for Road Vehicles, of which the following is a specification.

This invention is a fender or bumper for road vehicles, more particularly motor vehicles, and the objects in view are, first, to provide a yielding or cushion mechanism of simple construction for minimizing the jar and shock occasioned by one vehicle striking another or an obstacle in the path; second, to enable the fender to be varied in length in adapting the same to different vehicles; third, to mount the fender on the chassis of a vehicle by a simple construction, and, fourth, to attain a desirable resiliency in the parts or members of the fender at the ends thereof.

With these and other objects in view, my invention consists of the construction, combination and arrangement of parts which will be hereinafter described and claimed.

The invention is illustrated in the accompanying drawings, wherein—

Figure 1 is a plan view of my improved fender in position as it appears on the front part of a chassis.

Figure 2 is a view in front elevation.

Figures 3, 4, 5 and 6 are views in vertical cross section on the lines 3—3, 4—4, 5—5 and 6—6, respectively, of Figure 1.

Figure 7 is a plan view of another embodiment of the invention as applied to the chassis of a vehicle.

Figure 8 is a front elevation of the fender shown in Figure 7.

Figures 9 and 10 are vertical cross sections on the lines 9—9 and 10—10, respectively, of Figure 7.

Figure 11 is a detail view of a part of a chassis with the mounting for the fender of Figures 7 and 8, and Figure 12 is a perspective view of a clip forming a part of the fender mounting shown in Figure 11.

I will first describe the fender illustrated in Figures 1 to 6, inclusive, wherein the structure is composed of resilient members coupled for extensible adjustment to suit the widths of the chassis of different automobiles. One part of the fender is a duplex curved front member A composed in this instance of two curved bars $a$, $a'$ and a plurality of transverse plates $b$, $b$ and $b'$. The bars $a$ $a'$ each consist of a single continuous piece of spring metal, and they are positioned in spaced relation to each other, see Figure 2, so as to leave an intervening space in the plane of which is positioned the rearward members B, C, of the fender.

D, D are yokes composed of stiff metal positioned on the rear of the bars $a$, $a'$ of the front member, said yokes extending crosswise of the front member and spanning the space which intervenes the plates $a$, $a'$, see Figures 2 and 4. The end portions of each yoke D are in contact with the bars $a$, $a'$, and said yoke is fixedly attached to the bars $a$, $a'$ and to one of the transverse plates $b$ by means of bolts $d$, see Figure 4, whereby the bolts $d$ operate to fixedly attach the transverse plate $b$ to the front member-bars $a$, $a'$ on the forward side thereof, and they attach the yoke D to the same bars $a$, $a'$ on the rearward side thereof so as to maintain the the bars $a$, $a'$ in the desired spaced relation and act to fixedly retain said bars with respect to each other.

The bars $a$, $a'$ of the front member are additionally connected by yokes E, E', positioned at the rear of the front member, as shown in Figures 1, 2 and 5, the end portions of each yoke being in contact with said bars $a$, $a'$ and being fastened securely thereto by the bolts $e$, $e$.

The transverse plate $b'$ is positioned on the front of the bars $a$, $a'$ and in contact therewith, and in rear of said bars and the plate $b'$ is a yoke F, the ends of which are in contact with the rear faces of the bars $a$, $a'$, see Figures 1 and 3. Said ends of the yoke F and the plate $b$ are fixedly attached to the bars $a$, $a'$ by short bolts $f$. A longer bolt $f'$ passes through the middle part of the transverse plate $b'$ and through the offset middle part of the yoke F, said bolt $f'$ operating to fasten a plate G to the front member A of the fender. As shown, this plate G is positioned horizontally and between the bars $a$, $a'$ at the middle portion of the fender, said plate being curved lengthwise so that the ends of the plate pass rearwardly of the bars $a$, $a'$ of the front member A, see Figures 1 and 2.

Each rear spring member B, C is composed of a single flat piece bent to the irregular form shown in Figure 1 and producing spring arms $g$, $h$, one of which arms $h$ is longer than the other arm $g$. The short arm $g$ of each rear spring member is doubled to produce a loop $g^2$ and secured by a bolt $g'$, which looped end $g'$ is slidably engaged with one of the clips D. The long arm $h$ is bent into a double curvature, as shown in Figure 1, and the extremity of this longer arm is doubled to produce a loop $h'$ which is loosely engaged with one of the two clips E or E'. As shown in Figure 1, the loops $h'$, $h'$ of the two spring members B, C are engaged respectively with the clips E, E', and the adjacent ends of the arms $h$, $h$ of said spring members B, C are attached by bolts $h^2$ to a bridge plate H. The latter plate spans the space between the clips E, E' and the loop formed ends $h'$ of the arms $h$, $h$ on the respective rear spring members B C said ends of the bridge plate being slotted at $h^3$ to receive the bolt $h^2$, whereby the rear spring members are fastened adjustably to the bridge plate H. The bolt $f'$ passes through the middle portion of the bridge plate which is connected thereby to the front member A of the fender.

The several members A, B, C, of the fender are operatively connected together by devices which permit said members to yield or give under a shock or blow when the fender meets with an obstacle. The force of a collision is thus cushioned by the action of the fender, and this is noticeable when a side blow occurs, it being apparent that an end portion of the front member A is pressed rearwardly against the arm $g$ of the spring member B or C so that the parts B or C acts to yieldingly resist the backward thrust of said front member, but at the same time the looped formation $g'$ of the rear member slides on the clip D so as to avoid breaking and injury of the parts.

Each rear spring member B or C is formed with an eye $i$, see Figure 3, to receive a vertically positioned bolt I, the latter being carried by one of the two brackets J by which the fender is mounted on the "goose necks", so-called, $k$, of the chassis K, a part of which is shown in Figures 1, 6, 7 and 11 of the drawings. The bracket is composed of two parts $j$, $j'$, the former having lugs $j^2$ and provided with stud bolts $j^3$. The part $j$ is fitted against one edge of the channeled "goose neck" $k$ for the lugs $j^2$ to enter said channel, see Figure 6, whereas the part $j'$ bears against the opposite face of the channeled "goose neck" $k$, said two parts being clamped fixedly on the "goose neck" by the stud bolts $j^3$ passing through the part $j'$. The pivot bolt I is fixed to or unitary with the bracket part $j'$ to extend upwardly from it, and this bolt is provided with nuts $i'$ for engagement with the eye formed part $i$ of the spring member B or C, see Figure 11, a brace I' tending to stiffen the bolt against bending under a shock on the spring member. There are two brackets J, one on each "goose neck" of the chassis, see Figures 1 and 7, and the spring members B, C, are connected to said brackets by the bolts I, whereby the fender is supported on the chassis by simple mountings which are easily and quickly applied.

The fender shown in Figures 7, 8, 9 and 10 is simplified in several particulars as compared with the construction of Figures 1 to 6 heretofore described, but generally speaking the simplified form of fender embodies many of the features of the invention hereinbefore described. It includes a front member A' and two rear spring members B', C', together with the brackets J by which said fender is mounted on the chassis. The front member A' is a single curved spring bar, whereas the rear spring members B', C' are the same as the corresponding parts B, C heretofore described. The ends of the arms $g$ of the rear spring members are looped at $g'$ and connected loosely to the clips D', which clips are fixedly attached to the front member A' by the bolts $d^4$. At the front of the member A' is a plate G' which with the clips $E^3$, $E^4$ are attached by bolts $g^5$ to said member A', and passing through said parts A', G' is a longer bolt $g^6$, the latter being attached to a bridge plate H'. The arms $h$ of members B', C' are looped at $h^5$, said looped ends of the arms being slidably fitted to the clips $E^3$, $E^4$. The bridge plate H' spans the looped ends $h^5$ of members B', C', and said plate is slotted at $h^8$ and secured adjustably to the spring members by bolts $h^9$, see Figure 7. The bolt $g^6$ is attached to the bridge plate and connects the same to the front member.

In my device each rear member B, C or B', C' is provided with an eye $i$ in which is loosely fitted the bolt I whereby the rear member is hung so as to turn or swing when the fender meets an obstacle. Again, the bolts I are provided at top and bottom with nuts $i'$ so that the nuts may be rotated on the bolts for the purpose of raising or lowering the fender to suit different makes of motor cars.

Having thus fully described the invention, what I claim as new and desire to secure by Letters Patent is:

1. In a fender of the class described, a front member, a plurality of rear members, a bridge plate connecting the rear members, and means loosely connecting the front member with said rear members.

2. In a fender of the class described, a front member, a plurality of rear members, each of said rear members comprising a plurality of arms the forward ends of which are free from attachment to a chassis, means for supporting each rear member on a chassis, a bridge member spanning the space between corresponding arms of the rear members, means for attaching the bridge member to said corresponding arms of the rear members, and means for attaching the other arms of the rear members to the front member.

3. In a fender of the class described, a front member, a plurality of rear members, each of said rear members comprising a plurality of arms the forward ends of which are free from attachment to a chassis, means for supporting each rear member on a chassis, a bridge member spanning the space between corresponding arms of the rear members, means for slidably connecting the free ends of said corresponding arms to the bridge member, and means for attaching the front member to the other arms of said rear members.

4. In a fender of the class described, a front member, a plurality of rear members each embodying two curved arms, means for fixedly mounting on a chassis said rear members intermediate the ends thereof, a bridge member spanning the space between corresponding curved arms of said rear members, means for fastening said bridge member to said corresponding curved arms of the rear members, means for attaching the other curved arms of the rear members to the front member, and means for attaching the front member to the bridge member and the corresponding arms of the rear members.

5. In a fender of the class described, a plurality of rear members each comprising a plurality of curved arms, the ends of which are looped, a bridge member spanning the looped ends of corresponding arms of said rear members, a front member, means for attaching the front member to the looped ends of certain arms of the rear members, and other means for attaching the looped ends of the corresponding arms of the rear members to the bridge member and to the front member.

6. In a fender of the class described, a plurality of rear members, a front member, clips secured to the front member and slidably connected to the rear members, other clips attached to the front member and having slidable connection with the rear members, and a bridge member attached to the rear members.

7. In a fender of the class described, a plurality of rear members, brackets provided with bolts on which are hung the rear members, a front member connected to the rear members, and a bridge plate attached to said rear members.

In testimony whereof I have hereto signed my name this 20th day of June, 1924.

ERNEST P. GALASSI.